Figures 1, 2, 3:
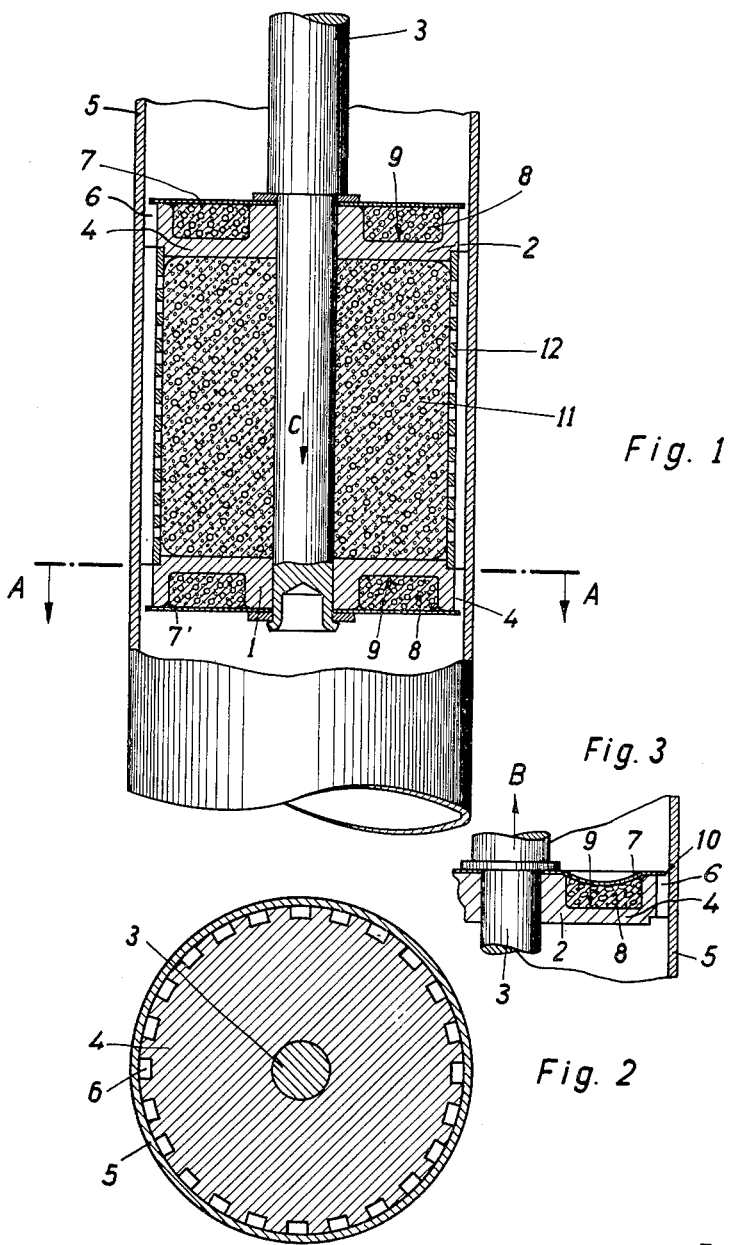

Oct. 2, 1962 W. ZEIDLER 3,056,473
SINGLE-TUBE HYDRAULIC SHOCK ABSORBERS
Filed April 23, 1959

Inventor:
Willi Zeidler
By
Watson, Cole, Grindle & Watson
Attys.

United States Patent Office 3,056,473
Patented Oct. 2, 1962

3,056,473
SINGLE-TUBE HYDRAULIC SHOCK ABSORBERS
Willi Zeidler, Dusseldorf, Germany, assignor to Firma
Rheinmetall G.m.b.H., Dusseldorf, Germany
Filed Apr. 23, 1959, Ser. No. 808,424
Claims priority, application Germany Apr. 30, 1958
3 Claims. (Cl. 188—100)

The present invention relates to a single-tube hydraulic shock absorber, more particularly for use in vehicles, having a cushion of foam rubber, foam plastic or similar material acted upon by the damping liquid and used to compensate for the effect of the volume of the piston rod of the absorber.

It is an object of the invention to provide a hydraulic shock absorber of that type simple in construction and reliable in operation which can automatically compensate for variations in the viscosity of the damping liquid due to changes in temperature.

According to the invention this problem is solved by incorporating the above mentioned cushion of foam rubber in the piston of the shock absorber and by the provision of valves, for example flat plate valves, between this cushion and the cylinder space above and below the piston, which control the flow of liquid from one side of the piston to the other. This ensures that the cushion will always during the operation of the shock absorber be on the side on which the pressure fluid flows away from the control elements, in other words on the trailing side, so that it is always subject to only comparatively low fluid pressures and hence to correspondingly small wear.

The cushion of foam material is with advantage located between two individual pistons mounted on the piston rod and is protected against immediate contact with the cylinder wall by some form of cover, for example a sheet metal envelope. This will largely protect the foam cushion against wear and mechanical damage so that it remains effective for a prolonged period of use.

The piston itself may in this arrangement be designed in a variety of ways. Thus the individual piston can for example be in contact with the cylinder wall by a number of tooth-like projections between which passages are left for the damping fluid to flow through whose effective cross sectional area is governed by the plate valves.

It may also be of advantage within the framework of the invention to provide an inset of foam material with closed pores between the individual pistons and the above mentioned plate valves, such that the pre-tension of the plate valves is acted upon by this inset in such a manner in the case of temperature variations of the damping fluid that the cross sectional area of the passages controlled by the plate valves will diminish when the temperature rises, whilst the dynamic pressure remains the same. This arrangement provides a very effective automatic temperature compensation by very simple means.

If the above feature is applied a particularly simple design will result if the inserts of foam material used for temperature compensation are located in an annular groove of the separate pistons open towards the outside.

By way of example only shock absorbers embodying the invention will now be explained in greater detail with reference to the accompanying drawings in which:

FIG. 1 shows a longitudinal section through a first embodiment taken through the piston and neighbouring components, FIG. 2 shows a section on the line A—A of FIG. 1, and FIG. 3 shows a detail of the embodiment of FIG. 1.

In the case of the embodiment shown in FIGS. 1 to 3, the piston is made up of two separate individual pistons 1 and 2 which are firmly attached to the piston rod 3. The outer surface of each of these separate pistons is provided with tooth-like projections 4 by means of which each piston is in contact with the inside wall of the cylinder 5 thereby leaving apertures 6 (FIG. 2) between adjacent pairs of teeth for the damping liquid to flow through. The effective cross sectional area of these apertures is controlled by plate valves 7 and 7' which in their position of rest (FIG. 1) leave small clearances between themselves and the cylinder wall.

In operation of the shock absorber these clearance spaces will increase in size due to the dynamic pressure of the liquid, the plate valves 7, 7' bending in the manner indicated in detail in FIG. 3.

The amount of bending of a plate valve depends on the resistance offered by a cushion 8 which consists of foam rubber or foam plastic with closed pores and which is located in an annular groove 9 in each of pistons 1 and 2. If the temperature of the damping liquid rises, the pressure of the air contained in the pores of the cushion 8 also will increase since the cushion is at all times in contact with the damping liquid or with parts heated by the damping liquid. Thus, as the pressure in the pores of the cushion 8 increases greater resistance is offered to the bending of the valve plates 7, 7', all other factors remaining equal. Consequently, the clearance 10 becomes smaller in size when the dynamic pressure remains the same and the temperature of the damping fluid increases.

Between the two separate pistons 1 and 2 there is another cushion 11 of foamed plastic, preferably of polyurethane foam, whose pore volume is such that it can compensate for the variable volume of liquid displaced by the piston rod during operation of the shock absorber and at the same time compensate for the expansion of the damping liquid due to increase in temperature. The peripheral surface of cushion 11 is protected from immediate contact with the inside wall of the dashpot cylinder 5 by a suitable cover, for example by a perforated sheet metal envelope 12.

When the piston rod moves in the direction of the arrow C (FIG. 1), i.e. when the telescopic leg contracts, dynamic pressure acts upon the plate 7' and bends it by an amount dependent upon the pre-tension of the foam cushion 8. The clearance originally existing between the valve plate 7' and the inner wall of the cylinder tube 5 will increase correspondingly. The fluid passing through the clearance 10, the hydrostatic pressure of which is of course very much smaller than its dynamic pressure, can now act on the cushion 11, the volume of the piston rod entering from above being thereby compensated. When the piston rod travels in the opposite direction the cushion of foam material will return elastically to its original position under the pressure of the gas enclosed in the pores. The cushion will act in a similar manner in compensating for the variations in volume of the damping liquid due to temperature variations.

I claim:
1. A hydraulic shock absorber particularly for vehicles comprising a cylinder, a piston rod in the cylinder having spaced pistons secured thereon and each piston having a cushion therein in an outer face thereof, a valve plate on each piston in contact with the cushion, said pistons having a cushion in the space between them which is spaced with a small clearance from the cylinder wall, said cylinder having a damping liquid therein, and said valve plates regulating the flow of liquid past the pistons and cylinder and the cushions in the pistons upon temperature changes of the liquid influencing the valve plates so that with increasing temperature the valve plates will decrease the amount of liquid flowing past the pistons due to the pressure in the cushions by greater resistance imparted to the valve plates.

2. A hydraulic shock absorber according to claim 1, in wich each piston on its outer face is provided with an annular groove to receive the cushion material therein.

3. A hydraulic shock absorber according to claim 1, in which a casing is provided between the pistons to receive the cushion material so that the space between the pistons and the cylinder may be varied and controlled by the expansion and contraction of the cushion material.

References Cited in the file of this patent

UNITED STATES PATENTS

| | | |
|---|---|---|
| 1,783,348 | Taylor | Dec. 2, 1930 |
| 2,264,111 | Briggs | Mar. 25, 1941 |
| 2,357,278 | O'Connor | Aug. 29, 1944 |
| 2,723,006 | Wyeth | Nov. 8, 1955 |
| 2,821,268 | De Carbon | Jan. 28, 1958 |
| 2,881,869 | Yarrick | Apr. 14, 1959 |
| 2,899,023 | Rumsey | Aug. 11, 1959 |
| 2,950,785 | Patriquin | Aug. 30, 1960 |

FOREIGN PATENTS

| | | |
|---|---|---|
| 1,123,417 | France | June 11, 1956 |